5788X
L. YALE.
DRESSING STONE.
Patented Jan. 20, 1830.
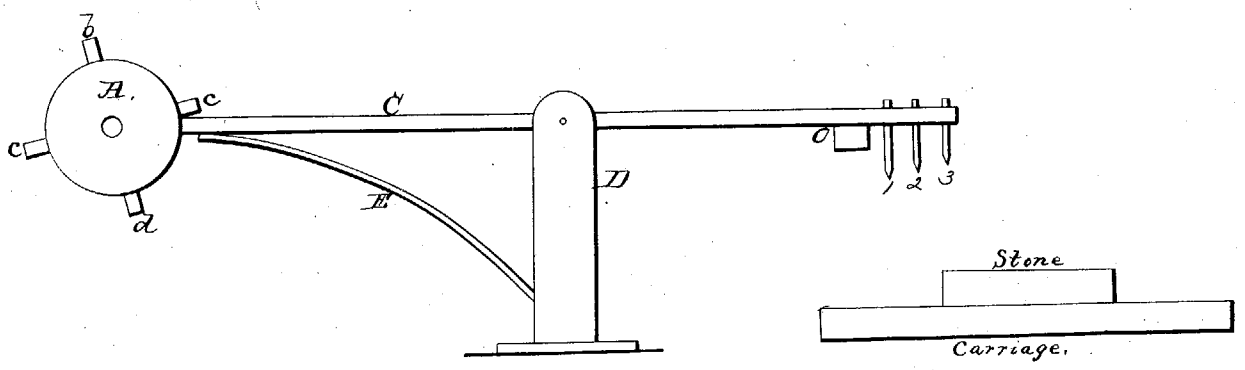
THE NORRIS PETERS CO., PHOTO-LITHO., WASHINGTON, D. C.

Jan 20 1830 99.

Lynus Yale, a citizen of the U. S.

Letters Patent. ×5788

The Schedule referred to in these Letters Patent, and making part of the same, containing a description in the words of the said Lynus Yale himself of his improvement for hewing, picking and drilling Stone by means of steel picks, chisels and hammers attached to a lever or handle &c.

A represents the end view of a shaft from 2 to 6 inches in diameter according to the size of the machine — length is according to No. of handles used. b. c. d. e Represent cams or cogs framed into the shaft. C represents a lever or handle to which the chis-els or picks or hammers (1. 2. 3) are fastened by screws. C, Represents the end view of a piece of timber framed at each end into the sides of the machine permanently on which the lever or handle, levers or handles used in the machine rest, and which when the cog 6 depress that end of the lever or handle & raises the other end receives the descending lever & prevents the chisels or picks (which by means of screws are of equal length at equal distan-ces from the ends of the Levers or handles) from operating at unequal depths upon the stone. —

The lever or handle is hung near the middle by a bolt or rod passing thro. near the top of the post D & its opposite in the machine — The motion to be given to the shaft A (if used by hand power) is by a common crank, & by a perpendicular cog wheel attached to the end of the shaft propelled by a horizontal cog wheel situate above or below as may be convenient. If used by means of horse [illegible] or steam power — E represents a spring made of

100. XS788 wood, wire or steel as may be necessary, fastened at bottom upon or near the sill passing from the foot of the post D to its opposite in the machine, and at the upper end presses upon the lever or shaft so as to keep it in a position horizontal to the centre of the shaft A. Remarks. By inspection of this draft it is obvious 1st that this machine may be constructed so as to contain from one to fifty levers or handles with from one to three chisels or picks on the end of each (as 1.2.3) that the shaft A must contain as many rows of cogs as there are levers or handles & that each lever or handle requires at least one spring.

2nd That guides or upright pieces of timber are framed between the levers or handles so as to give direction to the descending chisels or picks.

3rd That supposing the shaft to contain 6 cogs to each lever or handle that the machine has 12 levers or handles 3 chisels on the end of each one revolution of the shaft will occasion 216 strokes with a chisel upon the stone with the force of which the spring is capable. That should the shaft A revolve 30 times in a minute the stone will have received in that time 6480 strokes.

4. That a carriage or carriages are to be constructed containing no new principle in Mechanics, calculated to facilitate the operations of the Machine in the hewing, dressing & drilling of stone & that it is the object of the petitioner to secure to himself the right of building, using and vending any carriage or carriages for that purpose, leaving all others the right of building like carriages if they please for different uses & purposes.

5. That the main object of the ~~[illegible]~~ all persons without his consent, untill the Patent expires from hewing, picking or drilling of stone by means of steel picks chisel or hammers attached

X5788

101.

To any lever or levers, handle or handles, sustained as aforesaid by springs made of wood, wire or steel and propelled by means of a shaft set in motion by hand, horse, water or steam power.

Witnesses
J. O'Brien
W. W. Stimson

Nov 13. 1849

Linus Yale

Ex.d
Chf W.

737 ndo